April 6, 1948. D. H. PENNOYER 2,438,940
RANGE AND AZIMUTH SIMULATING SYSTEM FOR RADAR INSTRUCTION
Filed Dec. 6, 1943 4 Sheets-Sheet 2

INVENTOR
D. H. PENNOYER
BY M. R. McKenney
ATTORNEY

INVENTOR
D. H. PENNOYER
ATTORNEY

April 6, 1948.　　　D. H. PENNOYER　　　2,438,940
RANGE AND AZIMUTH SIMULATING SYSTEM FOR RADAR INSTRUCTION
Filed Dec. 6, 1943　　　4 Sheets-Sheet 4
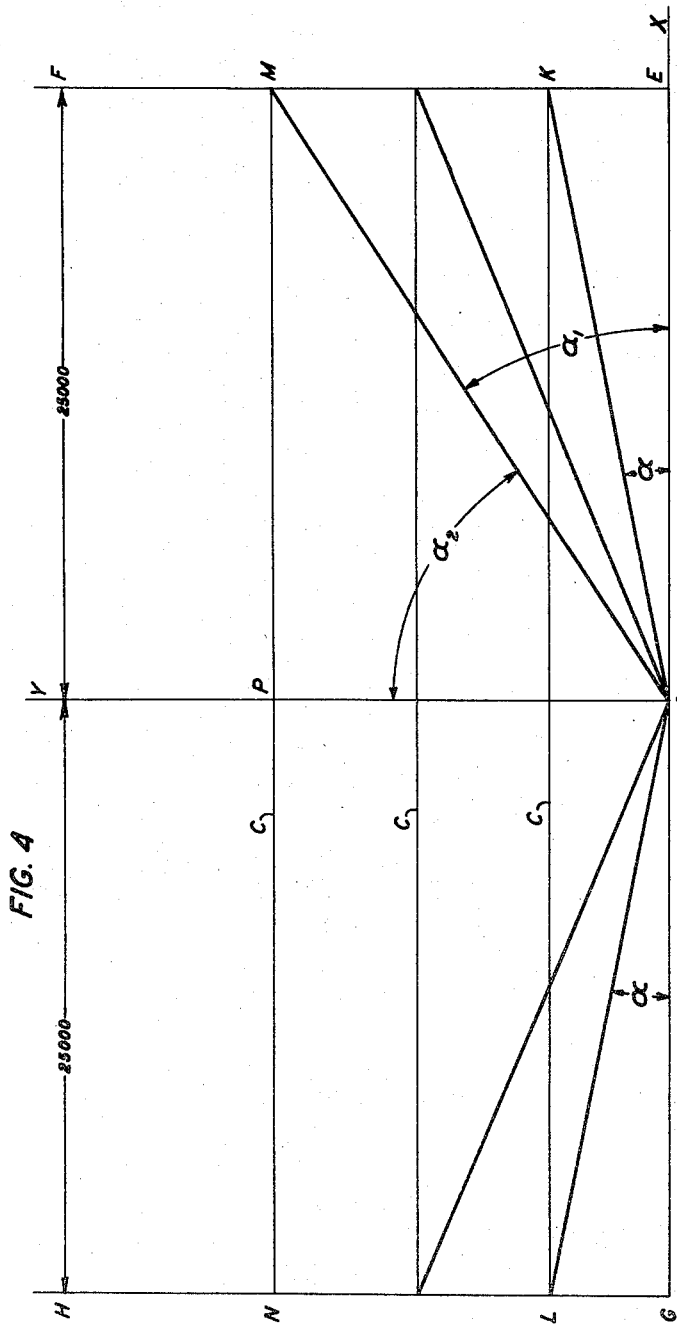
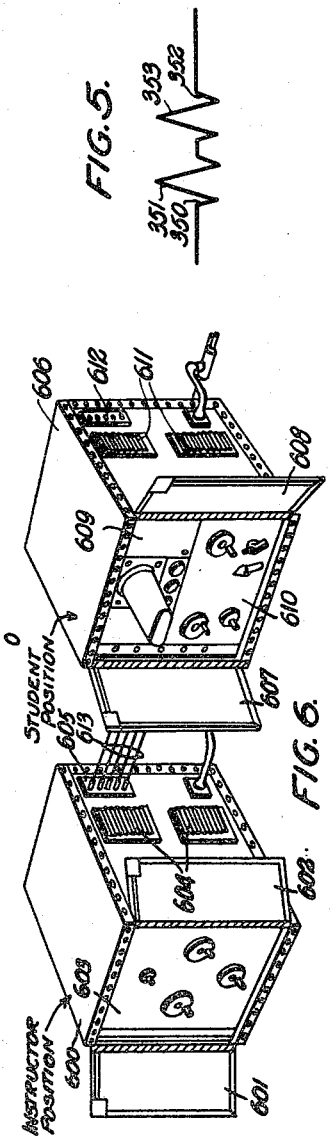
INVENTOR
D. H. PENNOYER
BY
ATTORNEY Patented Apr. 6, 1948

2,438,940

UNITED STATES PATENT OFFICE 2,438,940

RANGE AND AZIMUTH SIMULATING SYSTEM FOR RADAR INSTRUCTION

Douglas H. Pennoyer, Chatham, N. J., assignor to Bell Telephone Laboratories, Incorporated, New York, N. Y., a corporation of New York Application December 6, 1943, Serial No. 513,076

8 Claims. (Cl. 35—10)

This invention relates to object-locating systems and particularly to systems of this character for simulating the courses and movements of objects in space.

The objects of the invention are to simulate at will any desired course of an object moving in space; to generate a course in which the range and angular relation with respect to a reference point vary in any desired manner; to predetermine the speed at which the imaginary objects move; to produce electrical quantities which vary in accordance with instant values of the range and angular location of said object; to utilize these electrical quantities for training students in the art of locating moving objects; and in other respects to obtain improvements in systems of this general character.

Object-locating systems have been devised for obtaining a continuous derivation of the location of an airplane or other object moving at a variable speed along a variable course in space. In one such system directive radio impulses are transmitted from the point of observation to the airplane, from which they return as echo impulses. These returning impulses are received and utilized to form moving images on a screen before the operator which serve as a continuous representation of the range and angle, either azimuth or elevation, of the moving airplane. The operator is also provided with means, such as hand wheels, which he manipulates to follow or otherwise control these changing images. If he manipulates his range wheel accurately, its position at any instant is an exact measure of the range of the moving airplane, and the same is true with respect to the hand wheels with which he follows the azimuth and elevation angles.

Since the accuracy of the information obtained from these object-locating systems depends largely upon the proficiency of the operators, it is desirable to give these operators a preliminary course of training under conditions which simulate as closely as possible the actual conditions which they will ultimately encounter in operating the object-locating systems. Accordingly, a feature of the present invention is a training system which simulates automatically in terms of varying electrical quantities the courses over which imaginary objects are moving with respect to a given point of observation and which utilizes these varying electrical quantities to produce before the student visible images which appear and behave the same as those he would see if he were operating a locating system and observing a real object moving through space. More specifically, this system is capable of simulating an infinite number of courses which may be preselected at will to obtain the desired rate of change of range and azimuth angle with respect to the point of observation. To this end a shaft, rotatable by a driving motor through a given angular distance, represents in each of its angular positions the instant azimuth angle of the imaginary object; and a second shaft, likewise movable through an angular distance by a driving motor, represents the instant range values of said object. The degree of rotation of the azimuth and range shafts is determined by voltages applied to the driving motors under the control of resistors, one of which is located at the instructor's position and is manually adjustable by him to preselect the course he wishes to simulate.

The courses generated by this system are parallel lines of a fixed length lying in the same plane, which may be assumed to be a horizontal plane. The point of observation is also in this plane and lies in the perpendicular line which bisects the parallel course lines. If, therefore, the azimuth reference line is assumed to be parallel to the course lines, the azimuth angle has a minimum value at the starting point of any course, increases to 90 degrees as the object reaches the midpoint of the course, and continues to increase until at the end of the course it reaches a value of 180 degrees minus its starting value. Also the range has a maximum value at the starting point of the course, decreases to its minimum value at the midpoint, and then increases until at the end of the course it reaches the starting value.

According, therefore, to another feature of the invention the azimuth and range motors respond automatically, when the instructor adjusts his course resistor to select the course he wishes to simulate, and give their respective shafts initial settings which correspond to the azimuth angle and range of the starting point of the selected course. And according to a related feature the driving motors automatically bring their shafts to rest at angular positions which correspond respectively to the azimuth angle and range of the imaginary object when it reaches the end of the course.

A further feature of the invention is a system of this character in which the speed of rotation of the azimuth and range shafts is representative of the speed of the imaginary object in its course and is predetermined by a flight motor which operates during the generation of the course at a speed selected at will by the instructor.

A further feature of the invention is a system in which the azimuth and range motors generate a selected course by operating devices that vary the magnitude of electrical quantities, such as voltage amplitude and phase, in accordance with the varying azimuth angle and range, and in which these varying quantities are utilized to produce visible images before a student, representing to him the azimuth and range relations of the imaginary object moving along said course.

The foregoing and other features of the invention will be discussed more fully in the following detailed specification.

In the drawings accompanying the specification:

Figs. 1 and 2 show the equipment at the instructor's position, including the azimuth and range shafts, the operating and controlling motors and the associated resistors and phase shifters;

Fig. 3 shows the equipment at a student's position, including an oscilloscope and a phase shifter and resistor which the student operates manually;

Fig. 4 is a diagram showing some of the various courses that may be generated;

Fig. 5 illustrates the oscilloscope images for angular observation; and

Fig. 6 illustrates the instructor's apparatus cabinet and one student's apparatus cabinet as they would be set up for training purposes.

Figure 1:
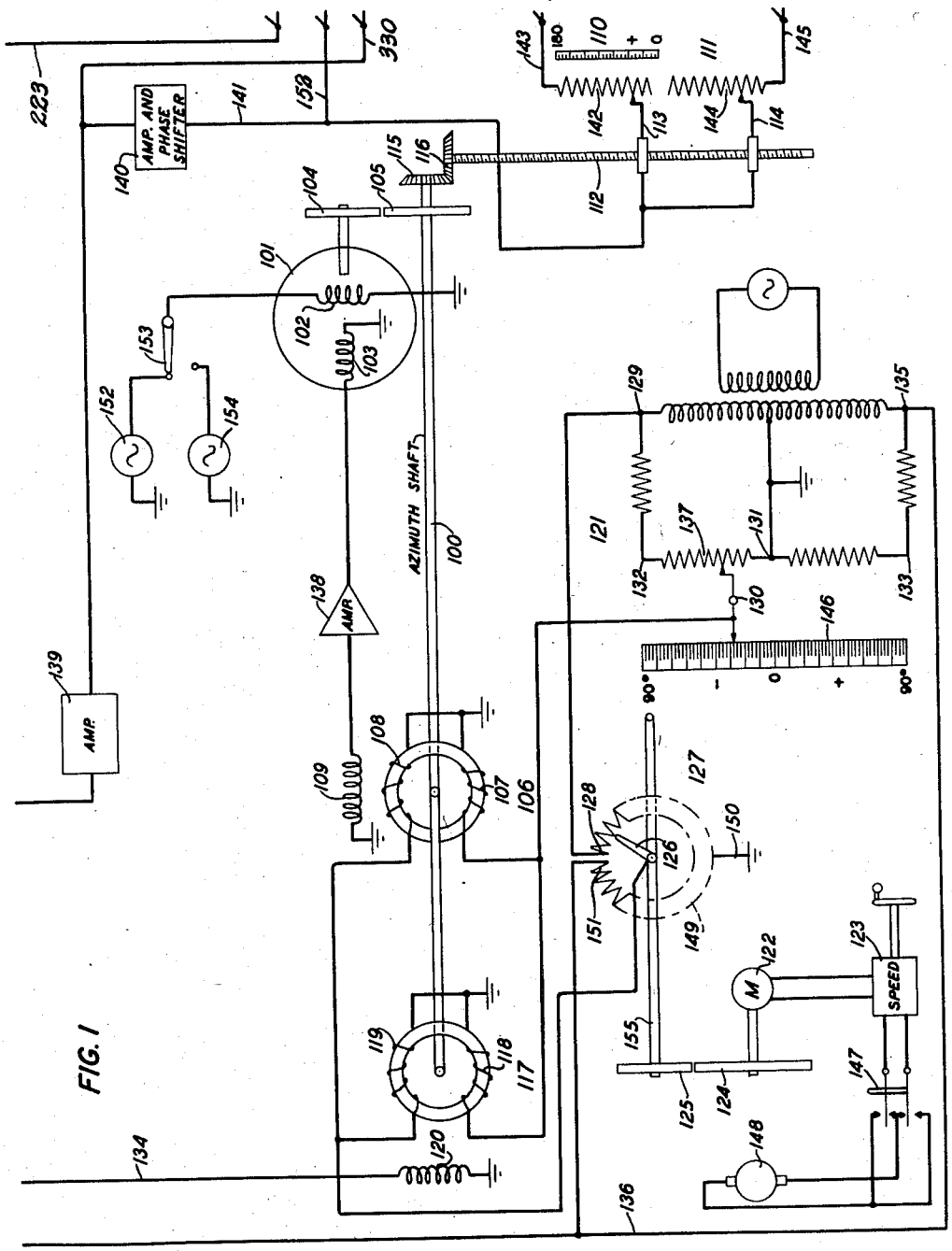
Figs. 1, 2 and 3 illustrate a training system including an electrical course generator embodying the features of the present invention.

Since the purpose of the training system disclosed herein is to prepare the student to operate an object-locating system under actual conditions which, of course, vary over a wide range, an effort has been made to give the instructor a choice of imaginary courses simulating all of the actual conditions, such as range, angular relation, and rates of change of these dimensions, which the student is likely to encounter when he is later entrusted with the manipulation of a locating system. The three dimensions of primary interest in the location of a moving object such as an airplane are range, azimuth angle, and ascension or elevation angle. In view of the close similarity from the operator's standpoint in the methods of deriving the azimuth and elevation angles it is usually considered sufficient for training purposes to omit one of these. It may be assumed, therefore, that all of the courses generated by the imaginary object lie in the same horizontal plane which contains the reference point or point of observation, thus omitting the elevation angle. It may also be assumed that all courses illustrated herein are straight lines, are parallel to each other, are perpendicular to a line including the point of observation, and are bisected by this perpendicular line. It will be understood, however, that the invention may be applied to systems in which more than one angular dimension is used, to systems in which the courses are curvilinear, and to those in which the simulated courses bear varying relations to each other.

The arrangement of courses above mentioned is illustrated in Fig. 4. The point of observation O is located on the line OY which is perpendicular to and bisects all course lines C which may be drawn between the parallel lines EF and GH. Although all courses are of the same length (50,000 yards, for example), it will be noted that the rates of change of range and azimuth angle differ widely depending on the course chosen. If the range is taken as the distance from the point O to the point of the imaginary object on the course, such as the distance OK when the object is at the starting point K of the course KL, and if the azimuth angle is taken as the angle α formed between the range line OK and the axis OX, the rate of these dimensions increases rapidly as the course line approaches the axis OX. For example, the rate of change of range and azimuth is much smaller for the course MN than it is for the course KL, and intermediate rates of change may be had by choosing intermediate courses. The system is so arranged that the instructor may choose any course he desires for testing the students; not only is he able to select a course having any desired rate of change of range and angle, but he may also determine the speed at which the imaginary object moves along the chosen course.

The apparatus at the instructor's position is mounted in an apparatus cabinet 600, shown in Fig. 6, having front closure doors 601 and 602 and a control panel 603. The sides of the cabinet are provided with ventilation slots 604 and with cable jacks, such as 605, by which the cabinet may be connected with one or more students' positions. The apparatus at a student's position is mounted in an apparatus cabinet 606, shown in Fig. 6, having front closure doors 607 and 608, a panel 609 on which an oscilloscope and controls therefore are mounted, and a control panel 610. The sides of the cabinet 606 are provided with ventilation slots 611 and with cable jacks, such as 612, by which the cabinet may be connected by plug-ended cables 613 with the instructor's apparatus cabinet 600 and with other students' cabinets similar to cabinet 606.

Figure 2:
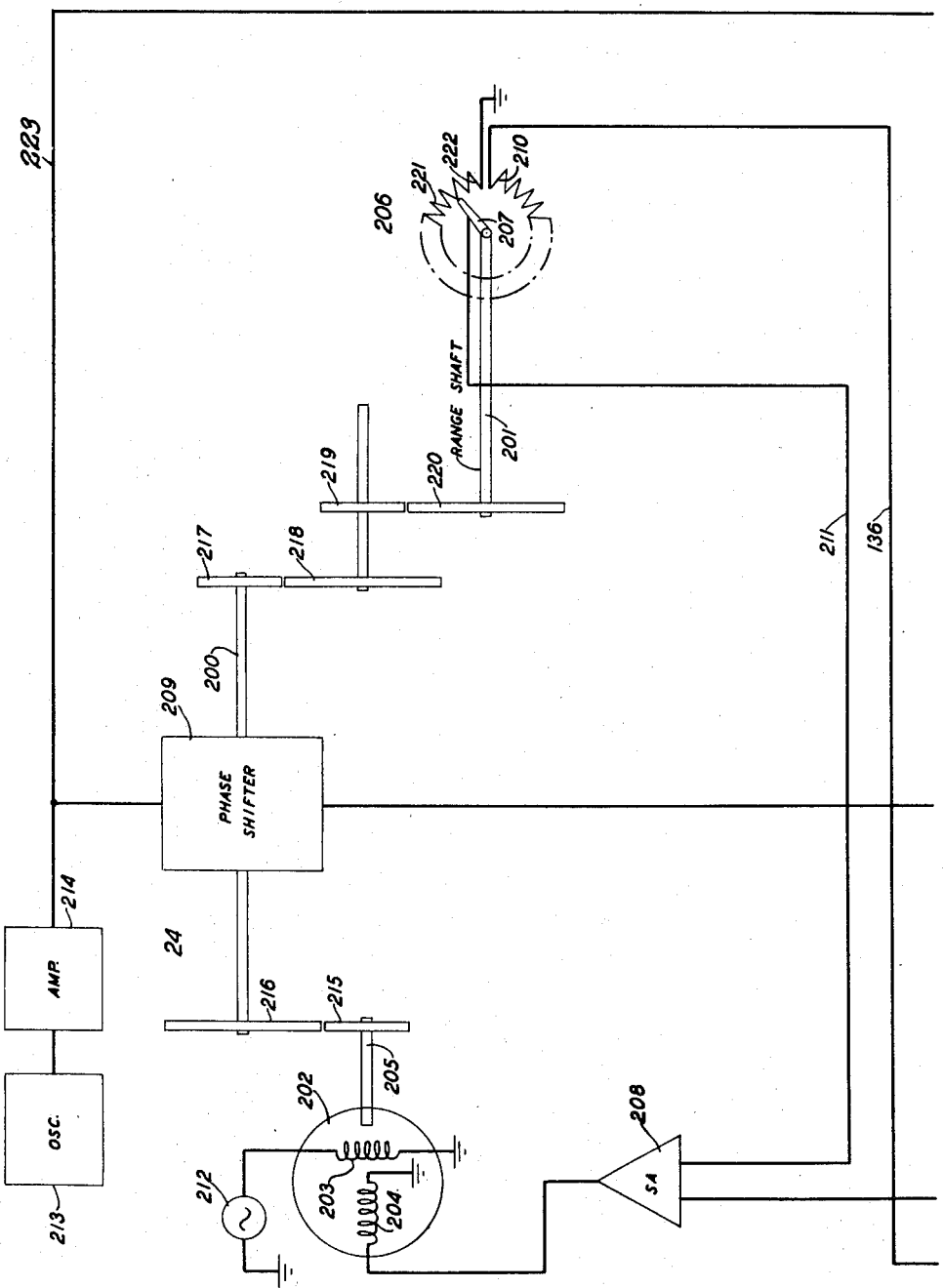
Figure 3:
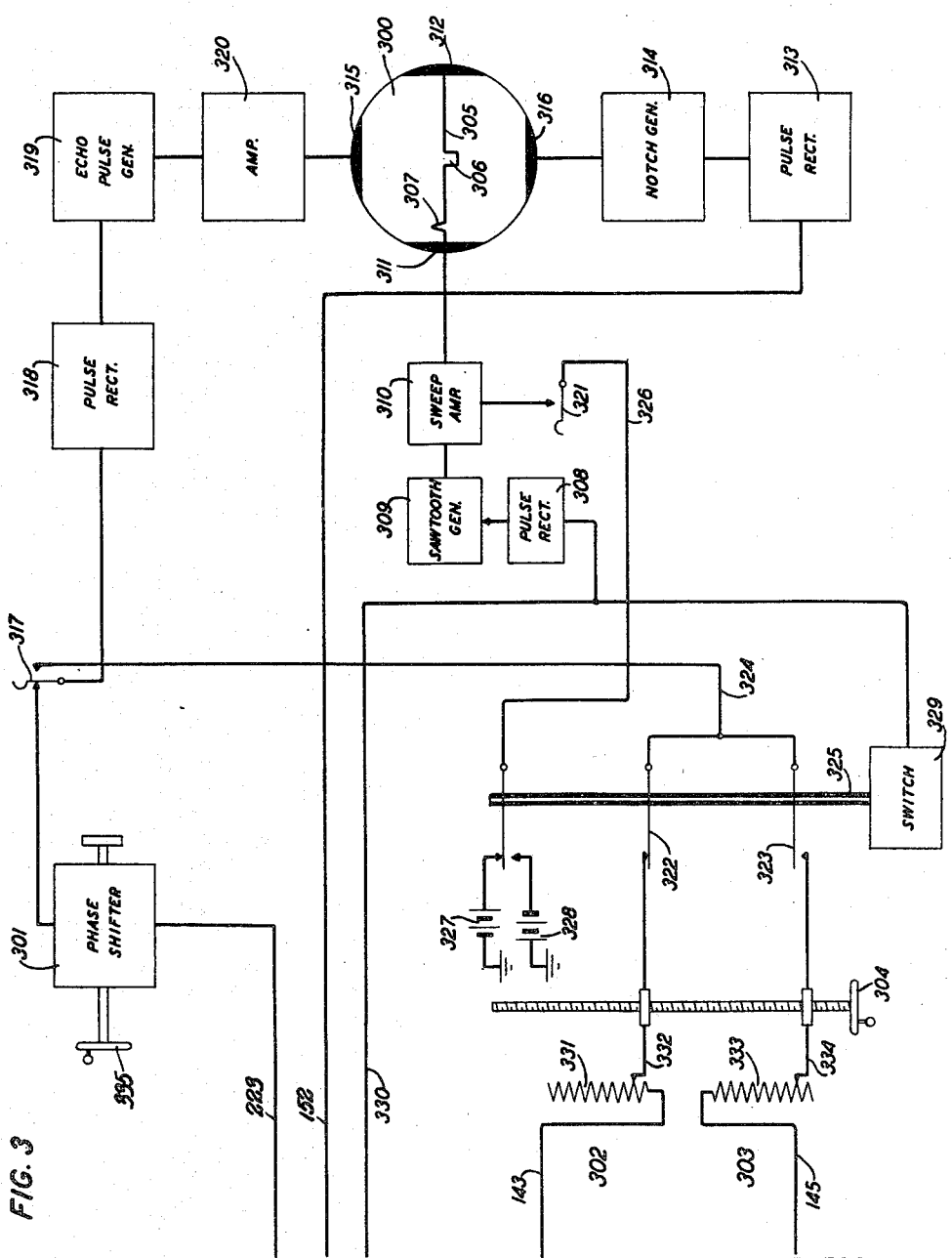

Referring now to Figs. 1 to 3, the instructor's position and the associated equipment is shown in Figs. 1 and 2 while one of a plurality of students' positions with the associated equipment is shown in Fig. 3. The mechanism for generating the course includes an azimuth shaft 100, the angular position of which represents the azimuth angle α. The shaft 100 is driven by a synchronous motor 101 having two stator windings 102 and 103. The shaft of the motor 101 carries a gear 104 for driving the azimuth shaft 100 through the associated gear 105. The synchronous motor 101 is controlled by a rotary synchronous transformer 106 comprising a pair of stator windings 107 and 108 and a rotor winding 109. The rotor 109 of the transformer 106 is mounted on the shaft 100 and rotates therewith. Voltages induced in the rotor winding 109 in the manner to be described hereinafter cause the synchronous motor 101 to rotate to drive the shaft 100 to represent continuously the azimuth angle of the imaginary object moving along the generated course.

The angular position of the azimuth shaft 100 is translated continuously by means of resistors 110 and 111 into electrical quantities representative of said azimuth angle. To this end the driving shaft 112, which carries the brushes 113 and 114, is driven directly from the azimuth shaft 100 through the bevel gears 115 and 116. The varying voltages controlled by these resistors in accordance with the azimuth angle are utilized, as will be explained later, to control the appearance of images formed on the screen of the oscilloscope 300 at the student's position.

The generating mechanism also includes range shafts 200 and 201. These shafts are driven through suitable gear connections by a synchronous motor 202 having two stator windings 203 and 204. The gear connections between the shaft 205 of the motor and the range shaft 201 are such that the shaft 200 makes a plurality of revolutions for one revolution of the shaft 201, two successive revolutions of the shaft 201 representing a full generated course.

The synchronous motor 202 is controlled in part by a secondary rotary synchronous transformer 117 having stator windings 118 and 119 and a rotor winding 120 which is mounted on the shaft 100 for rotation therewith. The motor 202 is also under the control of the range shaft 201 through the medium of resistor 206, the brush 207 of which is secured to the shaft 201 for rotation therewith. The joint control of the transformer 117 and resistor 206 over the synchronous motor 202 is exercised through a summing amplifier 208. To this end the rotor winding 120 of the transformer 117 and the output circuit of the resistor 206 are both connected to the input side of the amplifier 208 over conductors 134 and 211, respectively, and the output circuit of the amplifier is connected to the winding 204 of the motor over an obvious circuit.

The movement of the shafts 200 and 201 being a function of the range of the moving object, the shaft 200 is used to drive a phase shifter 209 and the shaft 201 is used to drive the brush of resistor 206. The phase shifter 209 translates the movement of the shaft 200 into an electrical quantity, namely, the phase angle of an alternating wave which is used at the student's position to form on the screen 300 an image representing the changing range of the object. Resistor 206 serves to determine the extent of rotation of the synchronous motor 202 to define the simulated course in terms of range.

The instructor's position is also equipped with a variable resistor 121, with which he is able to preselect any desired course, and with a flight motor 122 which operates to generate the selected course. The speed of flight of the imaginary airplane over the chosen course may be varied at will by the instructor by means of a rheostat or other suitable device 123 which controls the speed of rotation of the flight motor 122. The motor 122 through gears 124 and 125 drives a resistor brush arm 126 through a complete circle, and this resistor in turn varies the voltages of the transformers 106 and 117, causing the rotation of the motors 101 and 202 to produce the varying electrical quantities in the resistors 110 and 111 and in the phase shifter 209 which represent azimuth angle and range of the imaginary object throughout the generated course.

Before proceeding further with the system as a whole, a description will be given of the synchronous transformers 106 and 117 and the synchronous motors 101 and 202. The two stator windings of each transformer 106 and 117 are energized by alternating current of the same or of opposite phase. The two stator windings, however, are so disposed that they induce in the rotor winding a voltage proportional to the vector sum of the voltages in the stator windings which varies in magnitude from zero to a maximum value over a 90 degree angle of rotation of the rotor. For example, if windings 107 and 108 are energized by alternating voltages of the same phase but of different magnitudes, the resultant of these voltages induces a voltage in the rotor winding 109 the magnitude of which is proportional to said resultant and which also depends upon the angular position of the rotor. In one position of the rotor the induced voltage has zero value. If, however, the rotor is turned through an angle of 90 degrees, the induced voltage in the winding 109 has its maximum value. Similarly, the voltages induced in the rotor winding when the stator windings are energized separately vary between zero and maximum values at the 90 degree points in the rotation of the rotor. For example, the stator winding 108 induces zero voltage in the winding 109 when the shaft 100 is in its zero position, maximum voltage when the shaft is rotated 90 degrees and zero voltage at 180 degrees; and the stator winding 107 induces in the rotor winding maximum voltage at zero degrees, zero voltage at 90 degrees, and maximum voltage at 180 degrees. Moreover, there are two points in the cycle of rotation of the rotor at which the phase of the induced voltage reverses by reason of the angular position of the rotor with respect to the stator windings. For example, while the shaft 100 is rotating from its zero position through the first 90 degree angle, the induced voltage in the winding 109 is of a given phase, depending also, of course, upon the phase of the resultant of the voltages in the stator windings. As the shaft 100 rotates through the second 90 degree angle, the phase of the voltage in the winding 109 is reversed. In the third quadrant the phase remains the same as in the second quadrant, but in the last and final quadrant the phase of the voltage in the winding 109 again reverses. The significance of these phase relations with respect to the operation of the synchronous motor 101 will be explained more fully hereinafter. The foregoing explanation also applies to the transformer 117.

The synchronous motor 101 is a two-phase motor. That is to say, the voltages energizing the stator windings 102 and 103 are 90 degrees apart, and the direction in which the motor rotates depends on this phase relation. If the voltage in one winding leads that in the other by 90 degrees the motor rotates in one direction, whereas if the first-mentioned voltage lags the other by 90 degrees the motor will rotate in the opposite direction. Furthermore, the rotor comes to rest as soon as the voltage in either winding is reduced to zero notwithstanding the magnitude of the voltage in the other winding. What has been said of the motor 101 is also true of the other synchronous motor 202.

As above mentioned, the position of the azimuth shaft 100 represents the azimuth angle $\alpha$, and the position of this shaft is controlled by the resistor 121. Although the resistor brush 130 is always resting on some point other than the grounded midpoint 131 to insure the correct direction of rotation of the shaft 100, the midpoint position of the brush 130 corresponds to the zero angular position of the shaft 100. However, at the end of the last preceding flight the brush 130 is left in the position used during that flight, say at the position on the resistance wire 131, 132 illustrated in the drawing. Also following the last preceding flight it may be assumed that the flight control resistor 127 has its brush 126 standing at the end point 128 of the resistance wire 149. Under these conditions the full voltage of the point 129 is applied to the stator windings 108 and 119, and a relatively small voltage is applied by way of brush 130 to the stator windings 107 and 118. As a result of these two applied voltages in the windings 107 and 108 the induced voltage in the rotor winding 109 energized the stator winding 103 of the motor 101, and the motor 101 has caused the shaft 100 to rotate through an initial angle representing the position of the brush 130 and also equal to the starting azimuth angle of the course which that particular setting of the brush 130 represents. It will be noted that the voltages applied to windings 107 and 108 are of the same phase and that the azimuth shaft 100 is in the first quadrant of its rotation. Under these conditions the voltage induced in the winding 109 and applied through the amplifier 138 to the stator winding 103 bears a phase relation to the source 152 such that the synchronous motor 101 drives the shaft 100 in a direction to advance the brushes 113 and 114 upwardly over the resistances 142 and 144.

If now the flight motor 122 is operated to drive the flight brush 126 in a clockwise direction, the voltage applied to the winding 108 is constantly decreased until it reaches zero value at the grounded midpoint 150 of the resistor which corresponds to the midpoint of the flight. As the voltage in the winding 108 decreases to zero the voltage developed in the rotor 109 causes the motor 101 to rotate the shaft 100 through an angle of 90 degrees from its zero position at which time the brushes 113 and 114 are moved to substantially the midpoints of their associated resistances. The brush 126, continuing to move, passes the midpoint 150 and applies a potential to the winding 108 which gradually increases from zero to the maximum potential value of the potentiometer point 135. As soon as the brush 126 passes the point 150 the phase of the voltage applied to the winding 108 is reversed with respect to that applied to the winding 107. This reversal, however, is neutralized by a reversal which takes place at the same time by reason of the rotor 109 having passed the 90 degree point. Therefore, the phase of the voltage applied to the winding 108 remains unchanged, and the motor 101 continues to rotate the azimuth shaft 100 in the same direction from its 90 degree position to an angular position equal to 180 degrees minus the initial starting angle. At this stopping point the brush reaches the end point 151, and the resultant of the voltages applied to the windings 107 and 108 is of the same magnitude as the resultant of the voltages applied at the commencement of the course. As the shaft 100 rotates through the second half of the course, namely from its 90 degree point to an angle of 180 degrees minus the starting angle, the brushes 113 and 114 move upwardly on the resistance wires 142 and 144 and come to rest at the corresponding points on these wires.

Since the rotor 120 of the transformer 117 is displaced 90 degrees with respect to the rotor 109, the voltages developed in this rotor have their maximum values at the times when the corresponding voltages in the winding 109 have their minimum values and vice versa. Therefore, at the time the shaft 100 previously moved to its position of adjustment corresponding to the setting of the brush 130, the voltage developed in the rotor winding 120 has a maximum resultant value for the voltages applied to the stator windings 118 and 119 and is applied to the input side of the summing amplifier 208. It will be noted that the phase of the voltage applied over conductor 134 to the amplifier 208 is the same as the potential at the point 129. At the same time a voltage of the opposite phase from the point 135 is applied over conductor 136 to the end point 210 of the resistance wire 221 thence by way of brush 207, conductor 211 to the input side of the amplifier 208. These input voltages being of opposite phase are added algebraically by the amplifier and the resultant output voltage applied to the stator winding 204 of the motor 202 bears a phase relation with respect to the voltage applied from source 212 to the other winding 203 such that the motor rotates the shaft 201 through the intermediate gear mechanism to rotate the brush 207 in a clockwise direction until it reaches a point where the voltage applied over conductor 211 is equal to that applied over conductor 134. When the brush 207 reaches this point of initial adjustment, the output voltage of the amplifier 208 is reduced to zero and the motor 202 comes to rest.

Thus the range shaft 201 at the commencement of any flight occupies an initial position which, like the azimuth shaft 100, corresponds to the setting of the brush 130. Thereafter, as the flight brush 126 is driven from its initial position on the point 128 to the midpoint 150 and the azimuth shaft 100 rotates through an angle of 90 degrees, the voltage in the winding 120 decreases correspondingly. This decrease in voltage unbalances the summing amplifier 208 and a voltage now appears in the winding 204 which is equal to the algebraic sum of the two input voltages at the amplifier and which has a phase relation to the voltage of the source 212 such that the motor drives the shaft 201 to rotate the brush 207 from its initial starting point to the end point 222 where it arrives at the time the azimuth shaft 100 reaches the 90 degree point and the brush 126 reaches the midpoint 150. In other words, the brush 207 reaches the end point of the resistance wire 221 at the midpoint of the generated course. As the shaft 100 continues to rotate in the second half of the course and brush 126 moves from the midpoint 150 toward the end point 151, the voltage applied to the summing amplifier from the winding 120 increases to a maximum value and, being of opposite phase to the voltage applied from resistor 206, the resultant voltage now applied to the winding 204 bears a phase relation to the source 212 such that the motor 202 reverses and rotates in the opposite direction during the second half of the course. As the motor 202 rotates through the second half of the course, the brush 207 is returned from the end point 222 to its initial starting point where it comes to rest concurrently with the stopping of the azimuth shaft 100 and with the arrival of the brush 126 at the end point 151.

During the rotation of the azimuth shaft 100 for the generation of a course, the threaded shaft 112, driven by the shaft 100 through the gears 115 and 116, advances the brushes 113 and 114 upwardly over the resistance wires 142 and 143. As will be explained later, the setting of these resistors 110 and 111 determines the relative amplitude of a pair of azimuth image marks which appear on the screen 300 when the student is following the azimuth angle. Also the initial setting of the azimuth shaft 100 turns the rotor 120 of the transformer 117 to the corresponding angular position. Also during the generation of the course the rotation of the phase shifter 209 on the range shaft 200 varies the phase of an alternating wave at a rate corresponding to the rate of change of the range of the moving object, and this phase-shifted wave is utilized as will be explained later to control the movement of an image mark on the screen of the student's oscilloscope.

To choose a course of flight from the boundary line EF to the boundary line GH the instructor moves the brush 130 to a corresponding point between the zero point 131 and the full voltage point 132 on the upper half of the resistance wire. For example, if he wishes to preselect the course MN, he moves the pointer 130 to the corresponding point 137 on the resistance wire. The stator windings 107 and 118 are now energized by a voltage corresponding to the point 137, and corresponding voltages are induced in the rotor windings 109 and 120. The voltage in the winding 109 is applied to the winding 103 of the motor 101. Motor 101 commences to rotate and turns the shaft 100 to the point where the voltage induced in the rotor 109 is reduced to zero, whereupon the motor 101 comes to rest. The angle through which the shaft 100 turns to assume this position of initial adjustment is equal to $\alpha_1$ which is the azimuth angle corresponding to the starting point M of the course MN. The course MN is generated in the period of time required for the flight motor 122 to drive the arm 126 through a complete revolution. During this period the azimuth angle changes from the value $\alpha_1$ to the value 180 degrees minus $\alpha_1$. Likewise during this same period the range varies from the initial value OM to the midpoint value OP and then to the terminating value ON. For a given speed of the flight motor 122 it will be noted that the rate of change of the azimuth angle $\alpha$ and of the range depends on the course line selected. For example, the rate of change of these dimensions increases as the passing distance OP diminishes. In other words, the rate of change of these dimensions for the course line KL is much greater at a given rate of speed than that of the course line MN. Hence the instructor has a wide choice of courses all of which have different rates of change of the dimensions in which he is interested in testing the student's proficiency.

As mentioned hereinbefore, each student's position, illustrated in Fig. 3, is equipped with an oscilloscope 300 having a luminous screen on which images are formed representative of the changing range and azimuth angle of the imaginary object. Also the student's position is provided with a manually operable phase shifter 301 which he manipulates by the control wheel 335 to control certain images on the screen in his effort to follow the range of the moving object. Furthermore, the student is provided with variable resistors 302 and 303 which he manipulates with a hand wheel 304 to control other images on the oscilloscope screen in his effort to follow the azimuth angle of the moving object.

The range of the moving object is depicted to the student on the oscilloscope screen by means of a horizontal trace 305 having a reference mark, such as a notch 306, therein and a triangular shaped image mark or pip 307 which moves along the trace 305 in accordance with the movement of the object being followed. The notch 306 remains stationary on the screen and is located preferably near the center of the horizontal trace 305. Although the image mark 307, if undisturbed, moves along the trace 305 in accordance with the changing range of the object, the student can arrest the movement of this image and hold it in a fixed position by the proper amount of manipulation of the phase shifter 301. His object, therefore, is to operate the phase shifter at a rate which is just sufficient to hold the image mark 307 within the stationary notch 306.

The movement of the range mark 307 across the oscilloscope is effected by varying the phase of a wave taken from the common source of oscillations 213 in accordance with the varying range of the object. To this end the wave from the common source 213 is amplified by a suitable amplifier 214 and applied to the phase shifter 209 which is being operated by the shaft 200 during the generation of the course. The rate of change of phase caused by the shifter 209 represents the rate of change of range of the moving object. The output wave from the phase shifter 209 is amplified by a suitable amplifier 139 and is then utilized to sweep the beam of the oscilloscope 300 to produce the sustained horizontal trace 305 on the screen. To this end the output wave from the amplifier 139 is conducted to each of the students' positions where it is rectified by a suitable pulse rectifier 308 to produce impulses of like polarity, and these impulses are applied to the sweep generator 309 which produces in the well-known manner the voltage wave necessary to sweep the beam of the oscilloscope across the screen. The output voltage from the generator 309 is amplified if desired by an amplifier 310 before it is applied to the deflection plates 311 and 312 of the oscilloscope. Since the frequency of the sweep voltage is above the persistence of vision, the trace 305 appears as a permanent line on the screen. However, the commencement in time of each individual sweep of the beam bears a phase relation to the original source 213 which represents the range of the imaginary object. The manner in which this relation of the sweep voltage is utilized to move the image 307 will be disclosed presently. First it should be explained that the notch 306 is formed in the center of the trace 305 by means of a wave taken from the output circuit of the phase shifter 209 and subjected to a further shift of 90 degrees by means of any suitable phase-shifting device 140. After undergoing this 90 degree shift the wave is applied over conductor 152 to a pulse rectifier 313, and the output pulses from this device are applied from a suitable generator 314 which shapes or forms them into square-topped pulses and applies them to the vertical plates 315 and 316 of the oscilloscope. These square-topped pulses cause the formation of the notch 306 in the horizontal trace on the screen.

The formation and control of the range image mark 307 will now be described. A wave taken from the original source 213 and amplified by the amplifier 214 is applied over conductor 223 to the student's phase shifter 301. The output circuit from this phase shifter leads through the normal contacts of key 317 to the impulse rectifier 318. The rectifier 318 converts the alternating wave into a series of half waves of like polarity, and these half waves are then applied to an impulse generator 319 of any well-known type which converts them into a series of sharp impulses of like phase. The output impulses from the generator 319 are strengthened by a suitable amplifier 320 and are then applied to the vertical plates 315 and 316. Each time one of these impulses is applied to the oscilloscope plates a deflection is produced in the horizontal trace 305 to form the sharp pip 307. Since the time at which the image pip is formed with respect to the commencement of the sweep of the horizontal trace varies in accordance with the movement of the phase shifter 209, the image 307 will move along the trace 305 representing to the student the changing range of the imaginary object. By operating the phase shifter 301 through a given distance, a student is able to introduce into the pip-forming wave a shift of phase which is just sufficient to bring the pip 307 into juxtaposition with the notch 306 and thereafter to introduce continuously a change in phase which is just sufficient to maintain the pip in the notch. As long as he can maintain this relation, he is following the range of the target accurately.

The formation and control of the azimuth images will now be described. It should be noted that both the range and azimuth images are displayed on the same oscilloscope 300 but not concurrently. When the student is following the range, the keys 317 and 321 are in the positions indicated and are in the alternate positions when he is following the azimuth angle. With the keys in their alternate positions for azimuth tracking the horizontal trace 305 and notch 306 are formed in the manner above described but subject to variations which will now be explained. Also instead of forming a pip which moves along the horizontal trace on the screen the pip is now formed accurately within the notch, and by varying the sweep voltage periodically the single pip is translated into a pair of pips located side by side near the center of the screen. The formation of the azimuth pip within its notch is accomplished by taking a wave from the output of the phase shifter 140, applying it to the rectifier 318, utilizing the rectified impulses in the generator 319 to produce sharp impulses of like phase, and applying these impulses to the vertical plates 315 and 316 of the oscilloscope. Since the impulses applied to the vertical plates of the oscilloscope are always of the same phase as the impulses which form the notch in the horizontal trace 305, it follows that the image mark or pip is always located within the notch. This relation is illustrated in Fig. 5. The circuit for applying the pip-forming wave extends from conductor 141 on the output side of the phase shifter 140 through resistors 110 and 111 in parallel, through resistors 302 and 303 in parallel, thence through the switch contacts 322 and 323, conductor 324, alternate contacts of key 317 to the impulse rectifier 318.

The purpose of the switching device 325 is to switch the conductor 324 alternately from one pair of resistors 110—302 to the other pair 111—303 and at the same time to switch the conductor 326 from one to the other of the image spacing batteries 327 and 328. The switch 325 is driven or otherwise operated by a synchronizing motor or any other suitable synchronous mechanism for performing this switching operation in proper relation with respect to the sweep voltage. To this end the switch operating mechanism 329 is operated by a wave taken from the amplifier 139; therefore, the contacts of the switch 325 are opened and closed at the same frequency and in phase with the sweep voltages which produce the horizontal trace 305 on the screen 300.

With the azimuth shaft 100 in its normal position and with the resistors 110, 111, 302 and 303 in the positions shown in the drawing, assume that the wave in conductor 330 is in such phase that the switch 325 occupies the position shown in the drawing and that the beam of the oscilloscope 300 is about to sweep across the screen. The small positive potential applied to the sweep circuit from the battery 327 causes the notch 350 (Fig. 5) to occur just before the beam reaches the center of the screen 300. As this same instant the pip 351 is formed and occurs exactly within the notch. The circuit for the pip-forming wave may be traced from conductor 141, brush 113, resistance 142, conductor 143, resistance 331, brush 332, closed contact 322 and thence over conductor 324 as previously traced. On the next sweep of the oscilloscope beam the switch 325 occupies its alternate position, and the negative voltage of battery 328 biases the sweep voltage to cause the formation of the notch 352 just beyond the center of the oscilloscope screen. At the same instant that the notch 352 is formed, the associated pip 353 therein is formed. The circuit for the formation of the pip 353 may be traced from conductor 141, brush 114, resistance 144, conductor 145, resistance 333, brush 334, closed contact 323 to the conductor 324. This cycle is repeated at a rate above the persistence of vision. Therefore, both of the notches 350 and 352 and their associated image marks 351 and 353 appear continuously on the screen of the oscilloscope. With the resistors in the positions illustrated the relative values of the resistances in the parallel circuits determine the relative sizes of the two image marks 351 and 353. If the resistances of the four variable resistors are equal the images 351 and 353 will be of equal altitude. It follows, therefore, that the movement of the brushes 113 and 114 over their associated resistance wires 142 and 144 causes one of the image marks to decrease in altitude and the other image mark to increase in altitude provided the student does not operate his control wheel 304. However, by operating the wheel 304 at the proper rate the student is able to introduce compensating resistance values that hold the two image marks 351 and 353 at equal altitudes. As long as he is able to maintain this relation of the equality he is accurately following the azimuth angle of the imaginary object in space.

To describe briefly the operation of the system assume that the instructor wishes to simulate the flight of an airplane over the imaginary course C from the point M to the point N which may correspond in distance to 50,000 yards, he first moves the brush 130 from the position it is occupying at the time to the point on the resistance wire 131, 132 which corresponds to the starting azimuth angle α1. To facilitate the location of the brush 130 a scale 146 may be provided. Next the instructor sets the control device 123 corresponding to the desired speed of flight over the course MN. The positioning of the brush 130 causes the azimuth shaft 100 to take an immediate setting corresponding to the azimuth angle α1, and the brushes 113 and 114 are likewise positioned at points on their resistance wires 142 and 144 corresponding to the starting value of the azimuth angle. At the same time the positioning of the brush 130 and the movement of the shaft 100 cause motor 202 to operate as hereinbefore described, and the motor 202 through the gear train 215, 216, 217, 218, 219 and 220 rotates the range shaft 201 to position the brush 207 at a point on the resistance wire 221 corresponding to the starting range OM. If the instructor decides that the students are to follow the range of the imaginary object during the flight from M to N, he advises them to set their keys 317 and 321 in the normal positions as shown in the drawing. He then operates the reversing switch 147 to the position such that current from the generator 148 drives the flight motor 122 in the proper direction for rotating the flight resistor brush 126 around the resistance wire 149 in a clockwise direction. As the wiper 126 moves at a uniform rate through the first half of its cycle toward the grounded midpoint 150, it decreases the voltage applied to stator windings 108 and 119 at a constant rate from the maximum value of the potential at point 129 to zero value. The effect of this changing voltage in the stator winding 108 when combined with the constant voltage in the winding 107 is to cause the motor 101 to drive the shaft 100 at an increasing rate of change of the azimuth angle as the imaginary object approaches the midpoint P of its course MN, until finally when the brush 126 reaches the midpoint 150 the shaft 100 has rotated through an angle of 90 degrees from its normal position. That is to say, the sum of the starting azimuth angle $a_1$ and the angle $a_2$ is 90 degrees.

As the azimuth shaft 100 rotates at an increasing rate of speed to the midpoint the voltage in the rotor 120 diminishes at a decreasing rate from the maximum value to zero with the result that the motor 202 drives the phase shifter 209 at a rate which is relatively high at the commencement of the course and decreases as the imaginary object approaches the midpoint P of the course. An inspection of Fig. 4 will reveal why the azimuth shaft 100 should rotate at a progressively increasing speed and the range shaft 200 at a progressively decreasing speed as the imaginary airplane moves from its starting point M to the midpoint P of the course. The reason is that the rate of change of the azimuth angle increases and the rate of change of the range decreases in the first half of the flight. During the first half of the flight while the azimuth shaft 100 is moving from its starting to its midpoint position the resultant of the voltages applied to the summing amplifier 208 by the rotor winding 120 and the resistor 206 is spaced 90 degrees in phase and in a given sense with respect to the voltage delivered by the source 212 to the motor 202. Therefore, the motor 202 rotates in such a direction that the brush 207 of the resistor 206 moves from its starting position to the end point 222 of the resistance wire 221 during the first half of the course. As soon as the flight resistor brush 126 passes beyond point 150 to commence the second half of the course, the phase of the voltage applied to the stator winding 119 is reversed. Also a reversal occurs in the voltage induced in the rotor winding 120 since the rotor is now in its second quadrant. As a result of these two reversals the phase of the voltage in conductor 134 remains the same and of course the phase of the voltage applied from the resistor 206 to the summing amplifier 208 remains the same as in the first half of the course. But the voltage delivered over conductor 134 in the second quadrant leads the voltage in conductor 211 in magnitude. Therefore, the resultant of these voltages when applied to the summing amplifier 208 and thence to the stator winding 204 is 90 degrees out of phase in the opposite sense with respect to the voltage in the winding 203. Therefore, the motor 202 reverses and drives the brush 207 from its end point 22 back to the starting point on the wire 221 which now corresponds to the end point N of the flight.

During the second half of the flight as the object moves from the point P to the point N the azimuth shaft 100 rotates in the same direction at a steadily decreasing rate of speed until the brush 126 reaches the end point 151, at which time the shaft 100 will have rotated through an angle $a_2$ from its midpoint position. It will be noted that the stator windings 108 and 119 are energized during the second half of the course by voltage from the point 135 which is opposite in polarity to the voltage taken from the point 129 during the first half of the course. However, the windings on the transformers 106 and 117 are such that the induced voltages in the rotors 109 and 120 during the second half of the course are in the same direction as they were during the first half. Consequently the synchronous motor 101 continues to rotate in the same direction and the shaft 100 is driven to the position above mentioned, and the brushes 113 and 114 are driven to positions on their resistance wires 142 and 144 corresponding to the angular position of the shaft 100. Likewise during the second half of the course the motor 202 drives the phase shifter 209 at a constantly increasing rate of speed.

While the phase shifter 209 is being driven in one direction at a decreasing rate of speed and then in the opposite direction at an increasing rate of speed from the beginning to the end of the course, the range pip 307 on the student's oscilloscope tends to move across the screen at a corresponding rate. Although the direction of rotation of the phase shifter 209 changes at the midpoint of the course, this does not adversely affect the operation of the oscilloscope since the range image mark portrays the rate of change of range which is a function of the speed of rotation of phase shifter 209 and which is independent of direction. Observing the moving image mark, the student manipulates his phase shifter 301 to bring the mark into juxtaposition with the notch 306 and then endeavors to introduce the right amount of phase shift to hold the mark in the notch.

Assume now that the instructor, having generated a course from the point M to the point N, decides to execute a flight in the opposite direction along the course LK and that he wishes the students to follow the azimuth angle of the moving object on the return flight. He advises them to shift their keys 317 and 321 to the alternate positions and moves the brush 130 from its previously adjusted position to a new position on the resistance wire 131, 132 which corresponds to the starting azimuth angle $a$. This adjustment of the potentiometer brush 130 changes the voltages in windings 107 and 118, and the synchronous motors 101 and 202 immediately readjust the azimuth shaft 100 and the range shaft 201 respectively to positions representing the azimuth angle $a$ and the starting range OL. Next the instructor operates the switch 153 to connect the source 154 to the stator winding 102. The source 154 differs in phase from the source 152 by 90 degrees, and the purpose of this shift is to cause the motor 101 to drive the shaft 100 in the reverse direction and the brushes 113 and 114 downwardly over the associated resistance wires during the return flight from the line GH to the line EF. Finally the instructor closes the switch 147 for driving the motor 122 in the opposite direction to move the flight resistor brush 126 in a counterclockwise direction from its end point 151 back toward the end point 128.

At the beginning of the course LK the brushes 113 and 114 are standing at points near the upper ends of resistance wires 142 and 144 corresponding to the initial azimuth angle $a$ and the azimuth images 351 and 353 appear on the oscilloscope screen 300. As the shaft 100 rotates and the brushes 113 and 114 move over their resistances wires in response to the generation of the course by the flight motor 122, the student observes the changing altitudes of the images and manipulates his wheel 304 to introduce compensating values of resistance for the purpose of maintaining the images at equal altitudes. The degree with which he is able to approximate equal altitudes for the image marks is the measure of his proficiency in following the azimuth angle of the imaginary airplane moving along the course LK. The completion of the flight is determined by the return of the brush 126 to the end point 128. When the brush arrives at this point the azimuth shaft 100 will come to rest at an angle from its zero position equal to the angle α, and the range shaft 201 will come to rest with the brush 207 at a point on the wire 221 corresponding to the terminating range OK. It will, of course, be understood that the movement of the brush 126 through the zero point 150 on the return flight causes the reversal of the synchronous motor 202 to bring about the return movement of the brush 207 from its end point 222 to its initial starting point near the other end of the resistance wire.

The end points of the flights may be controlled manually by the instructor. To do this he observes the movement of the brush 126 and opens the switch 147 to stop the flight motor 122 when its brush reaches either one of the end points 128 and 151. If desired, however, any suitable switch-controlling device may be provided on the shaft 155 for opening the circuit of motor 122 at these end points.

The oscillator or generator 213, the amplifiers 214, 138, 139 and 320 may be of any suitable and well-known types. The phase shifters 209 and 301 may be of any suitable type such as the one disclosed in the patent to L. A. Meacham 2,004,613 of June 11, 1935. The impulse generator 319 may also be of any suitable and well-known type such as the one disclosed in the patent to Wrathall 2,117,752 of May 17, 1938. The notch generator 314 may be of any suitable type capable of generating notches or square-topped pulses. One such generator is shown and described in the application of A. G. Fox, Serial No. 448,099, filed June 23, 1942. The rectifiers 308, 313 and 318, which serve to convert alternating waves into impulses of the same polarity and of the same phase as the original wave may likewise be of any well-known type. Finally the oscilloscope 300, which is illustrated schematically in the drawing, may be of any well-known cathode beam device in which potentials on the vertical and horizontal plates serve to cause the movement of the beam in the desired manner across the luminescent screen on which the images are formed.

Reference is also made to the application of Andrews and Cesareo, Serial No. 513,042, filed December 6, 1943, which claims certain features of the training system disclosed herein.

What is claimed is:

1. In a mechanism for simulating courses of movement of an object in space, said object being related to a reference point by a dimension which varies in magnitude, the combination of a driven member, the instant position of which represents the magnitude of said dimension, means for preselecting a desired one of said courses, automatic means for operating said driven member to simulate the selected course, means controlled by said driven member for varying an electrical quantity to represent the variation in said dimension caused by the movement of the object along said course, and means for utilizing said varying electrical quantity.

2. In a mechanism for simulating courses of movement of an imaginary object in space, said object being related to a reference point by a dimension which varies in magnitude between different limits for each course simulated, the combination of a driven member movable through a variable distance and serving in each of its successive positions to represent the instant magnitude of said dimension, means for selecting a desired one of said courses, means controlled by said selecting means for causing said driven member to assume a position corresponding to the value of said dimension for the starting point of the selected course, means for operating said driven member to simulate the selected course, means controlled by said driven member for varying an electrical quantity to represent the variation in said dimension caused by the movement of the imaginary object along said course, and means for utilizing said varying electrical quantity.

3. In a mechanism for simulating the courses of movement of an object, said object having a range from a reference point which varies in magnitude from the starting point to the end point of each course simulated, the combination of a driven member, the instant position of which represents the range of said object, means for selecting a desired one of said courses, automatic means for operating said driven member to simulate the selected course, means controlled by said driven member for varying an electrical quantity to represent the variation in range caused by the movement of the object along the selected course, and means for utilizing said varying electrical quantity.

4. In a mechanism for simulating the courses of movement of an object, said object being related to a reference point by an angular dimension which varies in magnitude for each of the courses simulated, the combination of a driven member, the instant position of which represents the magnitude of said angular dimension, means for preselecting a desired one of said courses, automatic means for operating said driven member to simulate the preselected course, means controlled by said driven member for varying an electrical quantity to represent the variation in said angular dimension, and means for utilizing said varying electrical quantity.

5. In a mechanism for simulating the courses of movement of an imaginary object in space, said object having a range and azimuth angle relative to a reference point which vary in magnitude for each of the courses simulated, the combination of a driven member, the successive positions of which represent the instant magnitudes of range and azimuth angle, means for preselecting a desired one of said courses, automatic means for operating said driven member to simulate the selected course, means controlled by said driven member for varying electrical quantities to represent the variations of range and azimuth angle, and means for utilizing said varying electrical quantities.

6. In a mechanism for simulating the courses of movement of an object in space, said object being related to a fixed reference point by a dimension which varies in magnitude as the object moves along the simulated course, said dimension having different rates of change for different courses, the combination of a driven member, the successive positions of which represent the instant magnitude of said dimension, means for preselecting a desired one of said courses, automatic means for operating said driven member to simulate the selected course, means controlled by said driven member for varying an electrical quantity to represent the variation in said dimension caused by the movement of the object along said course, and means for utilizing said varying electrical quantity.

7. In a mechanism for simulating courses of movement of an imaginary object in space, the range of said object varying with respect to a fixed reference point as the object moves along the simulated course, the rate of change of range varying for the different courses simulated, the combination of a driven member, the successive positions of which represent the instant magnitude of said range, means for preselecting a desired one of said courses, automatic means for operating said driven member to simulate the selected course, means controlled by said driven member for varying an electrical quantity to represent the variation of range caused by the movement of the imaginary object along said course, and means for utilizing said varying electrical quantity.

8. In a mechanism for simulating the courses of movement of an imaginary object in space, said object being related to a fixed reference point by an angular dimension which varies in magnitude as the object moves along the simulated course, said angular dimension having different rates of change for different courses, the combination of a driven member, the successive positions of which represent the instant magnitude of said angular dimension, means for selecting a desired one of said courses, automatic means for operating said driven member to simulate the selected course, means controlled by said driven member for varying an electrical quantity to represent the variation in said angular dimension, and means for utilizing said varying electrical quantity.

DOUGLAS H. PENNOYER.

REFERENCES CITED

The following references are of record in the file of this patent:

UNITED STATES PATENTS

| Number | Name | Date |
| --- | --- | --- |
| 1,939,706 | Karnes | Dec. 19, 1933 |
| 2,321,799 | Cone | June 15, 1943 |